United States Patent
Xie

(10) Patent No.: US 12,542,507 B2
(45) Date of Patent: Feb. 3, 2026

(54) CIRCUIT ARRANGEMENT AND METHOD FOR SUPPLYING ELECTRIC POWER

(71) Applicant: SAX Power GmbH, Erbach (DE)

(72) Inventor: Anya Xie, Ulm (DE)

(73) Assignee: SAX Power GmbH, Erbach (DE)

( * ) Notice: Subject to any disclaimer, the term of this patent is extended or adjusted under 35 U.S.C. 154(b) by 117 days.

(21) Appl. No.: 18/683,795

(22) PCT Filed: Aug. 18, 2022

(86) PCT No.: PCT/EP2022/073118
§ 371 (c)(1),
(2) Date: Feb. 15, 2024

(87) PCT Pub. No.: WO2023/021156
PCT Pub. Date: Feb. 23, 2023

(65) Prior Publication Data
US 2024/0372497 A1    Nov. 7, 2024

(30) Foreign Application Priority Data

Aug. 19, 2021 (DE) ...................... 10 2021 121 590.0

(51) Int. Cl.
*H02P 27/06* (2006.01)
(52) U.S. Cl.
CPC .................................. *H02P 27/06* (2013.01)
(58) Field of Classification Search
CPC ....................................................... H02P 27/06
See application file for complete search history.

(56) References Cited

U.S. PATENT DOCUMENTS 10,442,309 B2 * 10/2019 Goetz ................... H02J 7/0016
11,088,550 B2    8/2021 Jaensch et al.
(Continued)

FOREIGN PATENT DOCUMENTS

DE    102011004248 A1    8/2011
DE    102018003642 A1 * 11/2019    .............. B60L 58/21

OTHER PUBLICATIONS

J. Qi, D. Lu., "Review of Battery Cell Balancing Techniques", Australasian Universities Power Engineering Conference, AUPEC 2014, Curtin University, Perth, Australia, Sep. 28 Oct. 1, 2014—Abstract only available.

*Primary Examiner* — Thai T Dinh
(74) *Attorney, Agent, or Firm* — Dickinson Wright PLLC

(57) ABSTRACT

A circuit arrangement for supplying electric-power to a primary consumer via a first operating AC voltage having a control device and at least one first inverter that has a first and second primary supply terminal between which the first operating AC voltage is present. The first inverter has a configurable first inverter module and a configurable second inverter module which jointly provide the first operating AC voltage. Provision is made for the first inverter to have a first secondary supply terminal arranged between the first inverter module and the second inverter module. The control device is designed to configure the inverter modules of the first inverter to provide a first secondary voltage between the first secondary supply terminal and one of the primary supply terminals to supply power to an auxiliary consumer. A supply voltage is generated by a rectifier from the secondary voltages.

18 Claims, 3 Drawing Sheets

(56) References Cited

U.S. PATENT DOCUMENTS

| | | | | |
|---|---|---|---|---|
| 11,735,782 | B2* | 8/2023 | Kamel Ahmed | H02J 7/007182 |
| | | | | 320/137 |
| 11,897,347 | B2* | 2/2024 | Slepchenkov | B60L 50/50 |
| 12,065,058 | B2* | 8/2024 | Slepchenkov | B60L 58/26 |
| 2013/0127251 | A1* | 5/2013 | Graovac | H02M 7/4835 |
| | | | | 307/82 |
| 2018/0043789 | A1* | 2/2018 | Goetz | H02J 7/0016 |
| 2018/0302019 | A1* | 10/2018 | Yang | H02P 6/08 |

* cited by examiner

CIRCUIT ARRANGEMENT AND METHOD FOR SUPPLYING ELECTRIC POWER

The present application is a U.S. National Phase Application of International Application No. PCT/EP2022/073118, filed on Aug. 18, 2022, which claims the priority of the German patent application No. 10 2021 121 590.0, the contents of which are completely incorporated herein by way of reference.

The invention relates to a circuit arrangement for supplying electric power to a primary load, which can be connected to the circuit arrangement, by means of a first AC operating voltage, according to the preamble of claim 1.

The invention further relates to a power supply system, an electrical load arrangement and a computer program.

The invention additionally relates to a method for supplying electric power to a primary load by way of a first AC operating voltage and to a secondary load by way of a secondary voltage.

In power supply systems, battery storage systems are sometimes used, such as photovoltaic home storage systems ("solar batteries") for storing surplus yield from photovoltaic systems, or drive batteries ("high-voltage storage systems") for supplying power to the electric motors or drive units of electric vehicles. Such battery storage systems sometimes require battery voltages of several hundred volts. However, since the cell voltage of a single battery cell is only a few volts (e.g. 3.7 V for a lithium-ion battery), many individual battery cells have to be connected in series to form a battery pack (hereinafter also referred to simply as a "battery").

Due to manufacturing factors, each battery cell of a battery exhibits differences in its properties, such as the cell capacity, self-discharge rate and temperature characteristics. Over time, these differences are further exacerbated by aging effects. As a result, some battery cells will have not yet reached their maximum charge level during charging, while other battery cells will be fully charged already. Overcharging the already fully charged battery cells can eventually result in damage to them or even destroy them. To prevent this, the charging process must be terminated prematurely.

The discharging process behaves in a similar way. While some battery cells are already completely discharged, other battery cells sometimes still have enough stored energy to continue to drive an electric vehicle, for example. In the example of the electric vehicle, driving operation would eventually have to be terminated prematurely, as otherwise the weaker battery cells would be deeply discharged, which can result in their being destroyed.

To ensure a smooth charging and discharging process, battery management systems (BMS) are used to balance the charge between the individual battery cells, see J. Qi, D. Lu., "Review of Battery Cell Balancing Techniques", Australasian Universities Power Engineering Conference, AUPEC 2014, Curtin University, Perth, Australia, Sep. 28 Oct. 1, 2014.

The most common method at the time of filing is so-called passive charge balancing. In this case, already fully charged battery cells are discharged via a resistor, while the other battery cells are charged further. An obvious disadvantage of this method is that valuable electrical energy is lost and that the method does not provide a solution for the discharge process either.

The problems with passive charge balancing can be resolved by means of active charge balancing. However, this technique requires complex circuits with power-electronics components and complicated control.

To generate three-phase voltages, e.g. for the electrical machines or electric motors in an electric vehicle, self-commutated inverters are often used. Typically, such an inverter consists of six power-electronics valves that are interconnected to form a three-phase bridge. In this "two-point inverter", the sinusoidal AC voltages are generated from pulsed voltages with three voltage levels (0, $\pm U_{DC}$). The level of the voltage pulses depends on the battery voltage $U_{DC}$ and is therefore constant. To generate AC voltages, the duration of the voltage pulses can be varied as an actuating element. It is usually calculated using the pulse width modulation (PWM) method. In this case, however, high interference voltages are found in the AC voltages in the superimposed frequencies. In order to reduce the harmonics of the voltage, it is known practise to increase the clock frequencies of the inverter. As a rule, the clock frequencies of a modern inverter are therefore in the range from several kHz to 100 kHz. However, the switching losses of the inverters increase in proportion to their clock frequency.

To charge the battery using an external AC power supply (e.g. from a home connection or from a charging column for electric cars), the inverter can be used to convert the AC voltage to DC voltage. The prerequisite for this is that the battery voltage is higher than the peak voltage of the AC power supply. In a low-voltage grid, this peak voltage is 360 V for a single-phase supply and 620 V for a three-phase supply. Since the level of the battery voltage is limited due to problems relating to safety and charge balancing, an expensive separate charger is required for most electric cars.

To avoid these problems, a modular inverter can be used, as proposed in DE 10 2011 004 248 A1, for example. In this technique, the individual battery cells are connected in series not directly, but via power-electronics H-bridge circuits. The principle may be suitable for single-phase loads, and even for three-phase loads.

A three-phase modular inverter can be formed from two single-phase modular inverters connected in series, for example, as proposed in the generic DE 10 2018 003 642 A1.

Many electrical load arrangements have not only the primary load but also one or more secondary loads. By way of example, electric cars require not only the drive motors, which can be regarded as primary loads, but also secondary loads, such as an air-conditioning system, headlamps, an entertainment system or radio, etc., to be supplied with electric power. The supply of power to such secondary loads is usually provided by means of a secondary voltage, which is lower than the AC operating voltage—in electric cars often by means of a DC voltage of 12 V or 48 V.

Providing the secondary voltage besides the AC operating voltage is comparatively complex.

By way of example, a conventional electric car generally has provision for a separate battery for the secondary voltage circuit, which is supplied with power via a separate DC chopper (also known as a DC-DC voltage converter or DC/DC chopper). In particular in a power supply system having a modular inverter, a sufficiently high DC voltage for supplying power to the secondary loads is not available in every operating state, however. As a rule, the amplitude and frequency of the output voltage of the modular inverter depend on the speed of the electric motor and thus proportionally on the speed of travel of the electric vehicle. In particular when the electric vehicle is at a standstill or travelling at low speeds, the secondary loads therefore cannot be guaranteed to be supplied with their rated voltage. Due to the frequency dependency of the output voltage of the inverter on the speed of the electric motor, low speeds additionally result in fluctuations in the secondary voltage that can no longer be adequately reduced using a capacitor.

In light of the known prior art, the object of the present invention is to provide a circuit arrangement that can be used not only to supply a primary load with an AC voltage but also to reliably supply a secondary load with a voltage from a DC voltage source, preferably using a modular inverter.

The present invention is also based on the object of providing a power supply system that can be used not only to supply a primary load with an AC voltage but also to reliably supply a secondary load with a voltage from a DC voltage source, preferably using a modular inverter.

Finally, it is also an object of the invention to provide an electrical load arrangement whose primary loads are supplied with an AC voltage and whose secondary loads are reliably supplied with a voltage from a DC voltage source, preferably using a modular inverter.

It is additionally an object of the invention to provide an advantageous method and a computer program for supplying electric power to a primary load by way of an AC voltage and to a secondary load by way of a voltage from a DC voltage source, preferably using a modular inverter.

The object is achieved for the circuit arrangement by way of the features presented in claim 1. The object is achieved with regard to the electrical load arrangement by the features of claim 16. The object is achieved in regard to the method by claim 18.

The dependent claims and the features described hereinafter relate to advantageous embodiments and variants of the invention.

There is provision for a circuit arrangement for supplying electric power to a primary load, which can be connected to the circuit arrangement, by means of a first AC operating voltage.

The primary load may be able to be connected to the circuit arrangement by any means. For example, the circuit arrangement may have terminals in order to connect the primary load or an electrical line or busbar connected to the primary load. The circuit arrangement may in some cases also be able to be mechanically connected to the primary load, for example to a housing part of the primary load by force fit, form fit and/or material bond.

The primary load is preferably not intended to be understood as a component of the circuit arrangement.

The primary load may be any electrical load or even a group of multiple electrical loads. The primary load is preferably an electric motor, a drive unit and/or at least one electrical load within a low-voltage grid (in particular a household power grid).

The first AC operating voltage for supplying electric power to the primary load is preferably a single-phase AC voltage. The primary load can be operated with a single phase, that is to say for example exclusively with the first AC operating voltage. However, the primary load can also be operated with multiple phases, in particular with three-phase current, together with further AC operating voltages, for example the second AC operating voltage and third AC operating voltage, which will be mentioned hereinafter.

The AC operating voltage(s) may be adjustable in amplitude, phase and/or frequency or else may be constant. Preferably, the AC operating voltage(s) has/have its/their phase, amplitude and/or frequency adjusted (in particular by the control device, mentioned hereinafter) during operation of the primary load in order to specify a specific operating state for the primary load, for example a speed and/or a torque of an electric motor.

According to the invention, the circuit arrangement has a control device and at least one first inverter.

The control device may be in the form of a microprocessor. Instead of a microprocessor, there may also be provision for any other device for implementing the control device, for example one or more arrangements of discrete electrical devices on a printed circuit board, a programmable logic controller (PLC), an application-specific integrated circuit (ASIC) or another programmable circuit, for example including a field programmable gate array (FPGA), a programmable logic array (PLA) and/or a commercially available computer. The control device may also arise as a combination of multiple electronic devices in a locally distributed arrangement within the circuit arrangement.

The control device may also be a functional module of a superordinate control unit, for example a functional module of the control module or battery management system, mentioned hereinafter, of the DC voltage sources or of a control unit of the primary load and/or the secondary load, mentioned hereinafter.

According to the invention, the first inverter has a first primary supply terminal and a second primary supply terminal, between which the first AC operating voltage is present.

The primary load may be able to be connected to the first primary supply terminal and to the second primary supply terminal, or may be able to be attached to said primary supply terminals.

According to the invention, the first inverter has a configurable first inverter module and a configurable second inverter module, the output side of which is connected in series with the first inverter module, which collectively provide the first AC operating voltage.

There may in particular be provision for each inverter module to have a first supply output and a second supply output. In order to connect the inverter modules to form said series arrangement, the second supply output of the first inverter module may preferably be connected to the first supply output of the second inverter module, the first supply output of the first inverter module being connected to the first primary supply terminal and the second supply output of the second inverter module being connected to the second primary supply terminal.

At this juncture, it will be mentioned that, in principle, there may also be provision for further inverter modules within the first inverter, which are preferably likewise connected in series with the first inverter module and the second inverter module, for example a third inverter module, a fourth inverter module or more inverter modules. Preferably, however, there is provision for precisely two inverter modules within the first inverter (that is to say the above "first inverter module" and the "second inverter module").

Additionally, there may in some cases also be provision for a parallel arrangement of the inverter modules within the first inverter, for example in order to increase the maximum output power that can be provided by the first inverter module, or the maximum output current.

According to the invention, the input sides of the inverter modules of the first inverter can each be connected to at least one DC voltage source.

The connection between a respective inverter module and the at least one DC voltage source can be made for example by way of appropriate supply lines and/or busbars. However, there may also be provision for a direct link to the DC voltage source(s).

The circuit arrangement may in some cases also be able to be mechanically connected to the at least one DC voltage source, for example to a housing part of the at least one DC voltage source (e.g. a housing part of a battery) by force fit, form fit and/or material bond.

The at least one DC voltage source is preferably not intended to be understood as a component of the circuit arrangement.

The DC voltage source may in particular be a single battery cell of a battery or may be a group ("battery module") of multiple interconnected battery cells of a battery. The DC voltage source may in some cases also be a complete battery or a combination of multiple batteries, however.

A "battery" is intended to be understood in the present case to mean both a rechargeable storage device (that is to say an "accumulator"/"battery pack"), the individual cells of which are also called "secondary cells", and a non-rechargeable storage device. A battery or battery pack may in some cases also comprise only a single battery cell. The present invention is therefore intended to be understood as being not necessarily limited to batteries having multiple interconnected battery cells. In addition, a battery in the present description can also mean a storage device for electrical energy that is not or not exclusively electrochemical in design, e.g. a capacitor.

In principle, however, the DC voltage source may be any DC voltage source, that is to say, for example, also a DC voltage provided by an electronic assembly, for example may be a DC voltage provided on the output side by a rectifier and/or a DC chopper. For simplification, the DC voltage sources are referred to hereinafter and hereinbefore essentially as battery cells of a common battery, which is not intended to be understood as limiting, however, but only as an example.

According to the invention, the inverter modules are each connected to the control device and designed to adjust amplitudes, phases and/or frequencies on the output side, for providing the first AC operating voltage, as specified by the control device.

The inverter or the inverter modules thereof may therefore be flexibly configurable as specified by the control device, for example in order to specify, control and/or regulate the operating behavior of the primary load.

According to the invention, there is provision for the first inverter to have a first secondary supply terminal that is arranged between the first inverter module and the second inverter module. The control device is designed to configure the inverter modules of the first inverter in such a way that at least one first secondary voltage is produced between the first secondary supply terminal and one of the primary supply terminals of the first inverter to supply power to a secondary load that can be connected to the circuit arrangement.

Preferably, the control device is designed to adjust the first secondary voltage independently of the first AC operating voltage by appropriately configuring the inverter modules of the first inverter.

The secondary load may, in principle, be any electrical load or may be a group of electrical loads. The secondary load is preferably an electrical load that can be operated independently of the primary load.

The secondary load may be able to be connected to the first secondary supply terminal and at least one of the primary supply terminals by any means. By way of example, the secondary load may be attached to said supply terminals directly or may be attached to the supply terminals via an electrical line or busbar connected to the secondary load. The circuit arrangement may in some cases also be able to be mechanically connected to the secondary load, for example may be connected to a housing part of the secondary load by force fit, form fit and/or material bond.

The secondary load is preferably not intended to be understood as a component of the circuit arrangement.

The secondary load is preferably an electrical load that can be operated with a DC voltage, preferably a secondary load of an electric vehicle, in particular an electric car, such as for example an air-conditioning system, a headlamp or an entertainment system.

The first secondary voltage is preferably a voltage with a lower amplitude than that of the first AC operating voltage.

The circuit arrangement proposed according to the invention can be used to generate the first secondary voltage for supplying power to the secondary load independently of the first AC operating voltage. This is advantageous because the first AC operating voltage of the primary load is often dependent on the present operating state of the primary load—for example on the speed of travel in the case of an electric motor of an electric vehicle. The proposed circuit arrangement is used to continue to ensure a reliable supply of power to the secondary load even for low amplitudes of the first AC operating voltage and/or for low frequencies of the first AC operating voltage.

As such, for example a secondary load of an electric vehicle may still be able to be reliably operated with the first secondary voltage by the proposed circuit arrangement even when the electric vehicle is travelling at very low speeds or is at a standstill.

According to one development of the invention, there may be provision for the circuit arrangement to have a second inverter, having a third primary supply terminal and a fourth primary supply terminal, between which a second AC operating voltage for supplying electric power to the primary load is present.

Preferably, the third primary supply terminal of the second inverter is connected to the second primary supply terminal of the first inverter. The first inverter may therefore be connected to the second inverter in a series arrangement.

The primary load may finally be able to be operated by means of the first AC operating voltage and the second AC operating voltage.

The primary load may be able to be operated with three phases by virtue of the primary load being connected to the first primary supply terminal, the second primary supply terminal, which is connected to the third primary supply terminal, and the fourth primary supply terminal, or being attached to said supply terminals.

In principle, the second inverter may also be used to operate a further load independently of the primary load, however. Particularly preferably, however, a three-phase current is generated from the interconnection of the first inverter and the second inverter to operate an electric motor of an electric vehicle.

In principle, the second inverter may be in any form. The second inverter therefore also does not necessarily have to be configurable. Preferably, however, the second inverter is of the same design as the first inverter.

Features and advantages described hereinbefore and hereinafter for one of the inverters may also be transferable to the other inverter. This also applies, in principle, to the inverter modules of the inverters and the inverter units of the inverter modules, mentioned hereinafter.

In one advantageous development of the invention, there may in particular be provision for the second inverter to have a configurable third inverter module and a configurable fourth inverter module, the output side of which is connected in series with the third inverter module, which collectively provide the second AC operating voltage and the input side of each of which can be connected to at least one DC voltage source and to the control device, and which are designed to adjust amplitudes, phases and/or frequencies on the output side, for providing the second AC operating voltage, as specified by the control device.

In principle, there may also be provision for further inverters (of identical or different design), for example a third inverter, a fourth inverter or more inverters. The further inverters may preferably be connected to the first and the second inverter in a series arrangement. A parallel arrangement is also possible, however, for example in order to increase the maximum output current of the circuit arrangement.

According to one development of the invention, there may be provision for the second inverter to have a second secondary supply terminal that is arranged between the third inverter module and the fourth inverter module, the control device being designed to configure the inverter modules of the second inverter in such a way that at least one second secondary voltage is produced between the second secondary supply terminal and one of the primary supply terminals of the second inverter to supply power to an electrical load, in particular the secondary load.

The second secondary voltage may be designed for example to supply power to a further electrical load, which is independent of the aforementioned secondary load. Preferably, however, the second secondary voltage is used to operate the already mentioned secondary load either with the first secondary voltage or with the second secondary voltage—or in some cases even jointly with both secondary voltages.

As mentioned at the outset, the secondary voltage may be an AC voltage or may be a DC voltage. If the secondary voltage is an AC voltage, the secondary load may in some cases also be able to be operated with multiple phases, in particular with three phases, when the secondary load is attached to the two inverters as appropriate. The secondary load may therefore also be able to be operated with three-phase current in some cases.

According to one development of the invention, there may be provision for the primary load to be able to be connected to the first primary supply terminal, the second primary supply terminal and the fourth primary supply terminal for three-phase operation, wherein a third AC operating voltage is present between the first primary supply terminal and the fourth primary supply terminal, which third AC operating voltage corresponds to the negative total voltage from the first AC operating voltage and the second AC operating voltage, and wherein the three AC operating voltages have the same amplitudes and a respective phase difference of 120° in relation to one another.

A symmetrical three-phase voltage may preferably be provided between the primary supply terminals to supply electric power to the primary load.

In one development of the invention, there may be provision for the first AC operating voltage to correspond to the sum of the individual output voltages of the first inverter module and the second inverter module.

Alternatively or additionally, there may be provision for the second AC operating voltage to correspond to the sum of the individual output voltages of the third inverter module and the fourth inverter module.

In a particularly preferred development of the invention, there may be provision for the inverter modules to each be in the form of a cascade of multiple inverter units.

Preferably, each of the inverter units can be connected to a different DC voltage source.

Such inverters based on a cascade of multiple inverter units are also called "modular inverters". In this technique, the individual battery cells are connected in series not directly, but via the individual inverter units, for example the power-electronics H-bridges mentioned hereinafter. The oscillating output voltage of the inverter modules is in this case generated using summed individual voltages of the individual DC voltage sources, said individual voltages being in a staircase pattern with small steps. The level of the smallest voltage step can correspond to the output voltage of the respective DC voltage source (e.g. the cell voltage of a battery cell, such as 3.7 V).

The use of a modular inverter allows the otherwise necessary high clock frequencies of a pulse-width-modulated output voltage and the associated switching losses to be greatly reduced.

Since the individual DC voltage sources can each be connected or disconnected by way of a separate inverter unit, charge balancing between the DC voltage sources, that is to say for example between multiple battery cells, is possible. If DC voltage sources fail, the inverter can additionally continue to be operated using the DC voltage sources that are still operational. The availability of the power supply system may therefore be much higher than with the conventional technique of direct series arrangement of the DC voltage sources. Defective DC voltage sources, for example defective battery cells, can be switched off and bypassed. This not least also provides the option of safely changing these DC voltage sources even during operation.

Advantageously, DC voltage sources of different ages or in different states and of different type can be used in the same power supply system.

The period of use of a battery block, for example, can therefore be significantly extended.

In one development, there may in particular be provision for the inverter units to each have an H-bridge circuit comprising four power-electronics switching elements that are configurable by the control device.

Such H-bridge circuits are known in principle (cf. also "cascaded H-bridge"). By way of example, reference will be made in this regard to DE 10 2018 003 642 A1, the disclosure content of which is completely incorporated in the present description by way of this reference.

By way of example, two of said power-electronics switching elements in each case may have their outputs connected to form a series arrangement and may form a respective common connecting path of the H-bridge circuit. There may be provision for two such connecting paths. In each of the two connecting paths, the power-electronics switching elements may have an output of the inverter unit attached between them. The respective ends of the connecting paths may be connected to one another, an input of the inverter unit being attached at each end; the two connecting paths may therefore be connected in parallel.

There may be provision for the configurable power-electronics switching elements to be in the form of bipolar transistors or preferably in the form of MOSFETs. In principle, however, any switching elements, in particular semiconductor devices, can be used. The configurable power-electronics switching elements may also be in the form of relays. The design of the configurable power-electronics switching elements is nonlimiting for the invention, in principle.

Preferably, all the inverters of the circuit arrangement have inverter modules with the same respective number of inverter units and therefore the same number of DC voltage sources. In particular, there may be provision for all the inverters and inverter modules to have the same number of cascaded H-bridge circuits.

In one development of the invention, there may be provision for the circuit arrangement to have a rectifier for providing a DC voltage to supply electric power to the secondary load.

In principle, the secondary load may also be able to be operated directly with an AC voltage, however—depending on the application or type of the secondary load. Preferably, however, the secondary load is supplied with said DC voltage, for example with a DC voltage between 12 volts and 48 volts.

The input side of the rectifier may be connected to the first primary supply terminal, the second primary supply terminal, the fourth primary supply terminal, the first secondary supply terminal and/or the second secondary supply terminal in order to generate the DC voltage from one or more of the potential differences produced between said supply terminals connected to the input side.

At this juncture, it will once again be mentioned that although the use of a rectifier for providing a DC voltage to supply power to the secondary load is preferred, it is not absolutely necessary—even if the secondary load is intended to be supplied with a DC voltage. In principle, it would also be possible to take a DC voltage from the first inverter and/or the second inverter directly in order to supply power to the secondary load. By way of example, one of the inverter modules of one of the inverters can generate the applicable DC voltage. The DC component can be filtered out from the AC operating voltage again in some cases if the DC component is a problem for operation of the primary load.

In one development, there may be provision for the rectifier to have an electronic valve arrangement or to be in the form of a valve arrangement, the valve arrangement being connected to the supply terminals attached to the input side.

The electronic valve arrangement is used to ensure that the greatest potential difference produced between the supply terminals is always available on the output side to supply power to the secondary load. It is therefore even easier to reliably operate the secondary load regardless of the amplitude, phase and/or frequency of the AC operating voltage.

In one advantageous development, there may be provision for the electronic valve arrangement to have one diode section, comprising two diodes oriented in the same direction and connected to form a series arrangement, per supply terminal attached to the input side. The supply terminal associated with the respective diode section may be attached between the two diodes of the diode section, the output sides of all the diode sections being able to be connected in parallel in order to collectively generate the DC voltage to supply electric power to the secondary load.

The use of diodes to produce the electronic valve arrangement may be a particularly simple and also inexpensive implementation. However, there may also be provision for other valve elements. The use of a diode as a valve element is intended to be understood as merely illustrative and not limiting. As an alternative to the diode rectifier described hereinbefore, there may also be provision for a thyristor-based rectifier or a rectifier of different design, for example.

In one advantageous development of the invention, there may in particular be provision for the control device to be designed to always configure the inverter modules in such a way that firstly the AC operating voltage(s) is/are provided to supply electric power to the primary load, and secondly the electrical potential difference between at least two of the supply terminals is greater than a voltage required for operating the secondary load.

There is preferably provision for all the potential differences between the supply terminals to be greater than the voltage required for operating the secondary load. If as many of said potential differences as possible are already independently great enough to operate the secondary load, active charge balancing between the DC voltage sources (e.g. battery cells) can take place particularly easily.

In one development of the invention, there may additionally be provision for the circuit arrangement to have a DC chopper, the input side of which is connected to the output-side DC voltage of the rectifier, and the output side of which provides a rated operating voltage for operation of the secondary load.

The DC chopper can be used to generate a regulated DC voltage and to make it available to the secondary load(s).

The electronic valve arrangement described above can additionally be used to ensure that, regardless of the operating state of the primary load, the output voltage of the rectifier is always higher than the rated voltage required for correct operation of the secondary load (e.g. 12 volts or 48 volts).

The use of a DC chopper is not absolutely necessary, however, in particular if the secondary load can also be operated with an unregulated DC voltage or if the secondary voltage can already be regulated by the control device.

In one advantageous development of the invention, there may be provision for the control device to be designed to interrupt a circuit for the primary load by virtue of the control device turning off at least one power-electronics switching element (for example a switchable semiconductor device or a switchable electronic fuse), situated in the circuit, of at least one inverter.

The power-electronics switching element for interrupting the circuit for the primary load may in particular be at least one of the power-electronics switching elements of one of the inverter units of one of the inverter modules. It may also be a separate power-electronics switching element, however.

Interruption of the circuit for the primary load may be advantageous in particular when the primary load is temporarily not intended to be operated anyway, for example when an electric motor is at a standstill. In this case, one of the inverters, one of the inverter modules thereof or one of the inverter units can then be deactivated, for example. The supply of electric power to the secondary load can then be ensured by the inverters, inverter modules and/or inverter units that are still active. This can simplify control of the inverters/inverter modules/inverter units, and may in particular be advantageous for particularly flexible charge balancing between the individual DC voltage sources.

In one development of the invention, there may be provision for the control device to be communicatively connected to a control module of at least one of the DC voltage sources in order to receive from the control module state information relating to the DC voltage source(s), the control device further being designed to take the state information into account when configuring the inverter modules for generating the AC operating voltage(s) and the secondary voltage(s).

The control module may in particular be a battery management system of a battery. A battery management system can be used to monitor and/or control the battery (sometimes also referred to as a power management system (PMS)) and can use analog and/or digital means to transmit information about the present state (for example state of charge and/or temperature status) and/or design or characteristic parameters (e.g. rated voltage, end-of-charge voltage and/or identification data) relating to the respective battery and the battery cells thereof.

According to one development of the invention, there may be provision for the control device to be designed to either include or at least intermittently exclude one of the DC voltage sources in the generation of the AC operating voltage(s) and/or the secondary voltage(s) on the basis of the state information transferred from the control module to that DC voltage source.

By way of example, faulty or overheated DC voltage sources can be excluded. In particular, deeply discharged battery cells can be excluded.

The invention also relates to a power supply system, comprising a circuit arrangement according to the explanations hereinbefore and hereinafter and the DC voltage sources.

A particularly advantageous application of the proposed power supply system relates to the supply of electric power to primary loads and secondary loads of an electric vehicle, in particular an electric car.

According to one development, there may be provision for the power supply system to have an energy storage assembly containing the individual DC voltage sources.

However, the DC voltage sources may also each be independent of one another and do not necessarily need to be held in a common energy storage assembly.

In one particularly advantageous development, there may be provision for the energy storage assembly to have a battery or to be in the form of a battery, the individual DC voltage sources being in the form of battery cells of the battery.

The invention also relates to an electrical load arrangement, in particular an electric vehicle, comprising a power supply system according to the explanations hereinabove and hereinafter, the primary load and the secondary load.

In principle, the electrical load arrangement may be any load arrangement that has firstly at least one primary load and secondly at least one secondary load. By way of example, the load arrangement may be an electric machine tool or even a building to be supplied with electrical energy.

In one advantageous development, there may be provision for the primary load to have an electric motor, in particular an AC motor or a three-phase motor.

Particularly preferably, the electrical load arrangement is an electric vehicle, because, according to the invention, the secondary loads of the electric vehicle can be reliably supplied with a sufficiently high voltage regardless of the speed of travel, that is to say even when the electric vehicle is travelling at low speeds or is even at a standstill.

The term "electric vehicle" describes any electrically operated means of transport, in particular vehicles on land, on water or in the air, including space vehicles. Preferably, however, the electric vehicle or the load arrangement is an electric car.

However, the invention is in particular also suitable for supplying electric power to households or industrial installations.

The invention additionally also relates to a method for supplying electric power to a primary load by way of a first AC operating voltage and to a secondary load by way of a first secondary voltage. The method comprises at least the following method steps:

operating at least one first inverter, which has a first inverter module and a second inverter module, the output side of which is connected in series with the first inverter module, the input side of each of the two inverter modules being connected to at least one DC voltage source; and adjusting output-side amplitudes, phases and/or frequencies of the inverter modules in order to generate the first AC operating voltage between external primary supply terminals of the series arrangement formed by the inverter modules, and in order to generate the first secondary voltage between a first secondary supply terminal, which is arranged between the two inverter modules, and at least one of the external primary supply terminals.

In particular, the proposed method can generate a secondary voltage (and therefore in particular an unregulated or regulated DC voltage) having an adequate voltage level for supplying power to one or more secondary loads, preferably using at least one modular inverter.

Finally, the invention also relates to a computer program, comprising control commands that, when the program is executed by a control device (in particular the aforementioned control device), cause said control device to carry out the method described hereinbefore.

Features that have been described in association with one of the subjects of the invention, specifically provided by the circuit arrangement, the power supply system, the load arrangement, the method and the computer program, are also advantageously implementable for the other subjects of the invention. Similarly, advantages that have been mentioned in association with one of the subjects of the invention can also be understood relative to the other subjects of the invention.

At this juncture, it will be pointed out that the term "connected" or "connection" used in the present description and in the patent claims can describe a direct electrical connection for the stated components, but also an indirect electrical connection for the stated components (that is to say e.g. via further electrical lines or electronic devices such as resistors, inductances and/or capacitances, etc.). The term "attached", on the other hand, generally indicates a direct connection for the stated components.

It will additionally be pointed out that terms such as "comprising", "having" or "with" do not exclude other features or steps. Furthermore, terms such as "a/an" or "the" indicating steps or features in the singular do not exclude a plurality of features or steps—and vice versa.

In a puristic embodiment of the invention, however, there may also be provision for the features introduced by the terms "comprising", "having" or "with" in the invention to be enumerated exhaustively. Accordingly, one or multiple enumerations of features in the context of the invention can be considered to be self-contained, for example considered in each case for each claim. The invention can consist for example exclusively of the features mentioned in claim 1.

It will be mentioned that labels such as "first" or "second", etc., are used primarily for reasons of distinguishability from respective apparatus or method features and are not necessarily intended to indicate that features are mutually dependent or related to one another.

Furthermore, it will be emphasized that the values and parameters described in the present case include deviations or variations of ±10% or less, preferably ±5% or less, more preferably ±1% or less, and very particularly preferably ±0.1% or less, of the value or parameter respectively mentioned, provided that these deviations are not excluded in practice in the implementation of the invention. The specification of ranges by way of start and end values also encompasses all those values and fractions that are included by the range respectively mentioned, in particular the start and end values and a respective median value.

The invention also relates to a circuit arrangement independent of patent claim 1 for supplying electric power to a primary load, which can be connected to the circuit arrangement, by means of an AC voltage generated from multiple individual DC voltage sources by at least one inverter, the inverter additionally providing a secondary voltage for supplying electric power to a secondary load that can be connected to the circuit arrangement. The further features of patent claim 1 and the dependent patent claims and the features described in the present description relate to advantageous embodiments and variants of this circuit arrangement.

Exemplary embodiments of the invention are described in more detail hereinafter on the basis of the drawings.

The figures each show preferred exemplary embodiments in which individual features of the present invention are illustrated in combination with one another. Features of an exemplary embodiment are also able to be implemented independently of the other features of the same exemplary embodiment, and may accordingly readily be combined with features of other exemplary embodiments by a person skilled in the art to form further expedient combinations and sub-combinations.

In the figures, functionally identical elements are provided with the same reference signs.

Schematically:

Figure 1:
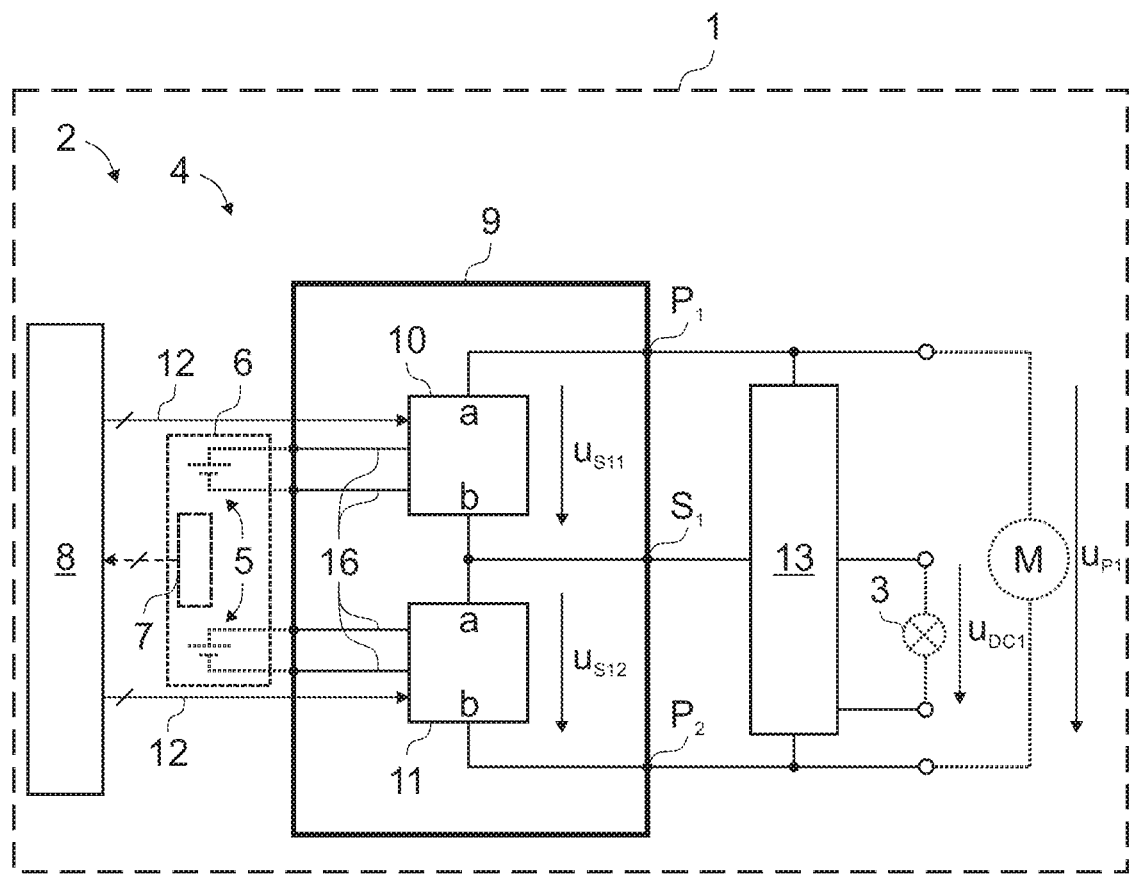
FIG. 1 shows an electrical load arrangement according to the invention with a power supply system according to the invention that has a circuit arrangement according to a first exemplary embodiment of the invention.

FIG. 1 shows an electrical load arrangement 1, which may be an electric vehicle (in particular an electric car), for example. The load arrangement 1 has a power supply system 2 in order to supply electric power to a primary load M and a secondary load 3. The primary load M in the exemplary embodiments is an electric motor, to be more precise an AC motor (cf. FIG. 1) or a three-phase motor (cf. FIG. 4). The secondary load 3 may be in the form of any electrical load or in the form of a group of multiple electrical loads, for example in the form of an illuminant, an electrical circuit, a heat source and/or also in the form of an electric motor. Preferably, the secondary load 3 is an electrical load that can be operated with a DC voltage, and the primary load M is an electrical load that can be operated with an AC voltage. By way of example, the secondary load 3 of an electric vehicle may be an air-conditioning system, a lighting device, an entertainment system, a driver assistance system or another piece of electronic equipment of the electric vehicle.

The power supply system 2 has a circuit arrangement 4 and multiple DC voltage sources 5. The DC voltage sources 5, which are shown in dashed lines in FIG. 1, are part of a common energy storage assembly 6 in the exemplary embodiment. The energy storage assembly 6 is preferably a battery or battery pack, the individual DC voltage sources 5 being in the form of battery cells of the battery or battery pack. In particular, the DC voltage sources 5 may be battery cells of a high-voltage storage system of an electric vehicle. The energy storage assembly 6 is hereinafter sometimes referred to as a battery and the DC voltage sources 5 as battery cells. This is merely a preferred application, however, which is not intended to be understood as limiting.

The energy storage assembly 6 or the battery may have a control module 7, in particular a battery management system, in order to ascertain state information relating to the battery cells 5 and to make said information available via a battery interface (cf. FIG. 1). Said state information may in particular be information relating to the present state of charge, relating to the present temperature or relating to the present "state of health" of the respective battery cell 5.

The circuit arrangement 4 proposed according to the invention is used primarily for supplying electric power to the primary load M, which can be connected to the circuit arrangement 4, by means of at least one first AC operating voltage $u_{P1}$.

The circuit arrangement 4 has a control device 8 and at least one first inverter 9.

To supply power to the primary load M, the first inverter 9 has a first primary supply terminal $P_1$ and a second primary supply terminal $P_2$, between which the first AC operating voltage $u_{P1}$ is present.

The first inverter 9 is configurable and, to this end, has a configurable first inverter module 10 and a configurable second inverter module 11, the output side of which is connected in series with the first inverter module 10. The two inverter modules 10, 11 collectively provide the first AC operating voltage $u_{P1}$ and the input side of each of said inverter modules is connected to at least one of said DC voltage sources 5 or battery cells and, for configurability, additionally to the control device 8. Each of the inverter modules 10, 11 has a first supply output a and a second supply output b, which are connected in accordance with the series arrangement. The first AC operating voltage $u_{P1}$ is finally produced from the sum of the individual output voltages $u_{S11}$, $u_{S12}$ of the first inverter module 10 and the second inverter module 11.

The control device 8 is designed to configure the first inverter 9 via respective communication lines 12 in order to optimally adjust the amplitude, phase and/or frequency of the first AC operating voltage $u_{P1}$ of the primary load M for operation of the latter. The control device 8 can therefore be used to adjust the first AC operating voltage $u_{P1}$ in such a way that for example an envisaged speed of the electric motor and/or an envisaged torque of the electric motor are produced.

There is provision for the first inverter 9 to have a first secondary supply terminal $S_1$ that is arranged between the first inverter module 10 and the second inverter module 11. A first secondary voltage $u_{S11}$ or $u_{S12}$ that can be used to supply power to a secondary load 3 that can be connected to the circuit arrangement 4 is therefore finally produced between the first secondary supply terminal $S_1$ and one of the primary supply terminals $P_1$, $P_2$ of the first inverter 9.

The control device 8 may finally be designed to configure the inverter modules 10, 11 of the first inverter 9 in such a way that an appropriately suitable first secondary voltage $u_{S11}$ or $u_{S12}$ for operation of the secondary load is produced. The control device 8 is in particular designed to always configure the inverter modules 10, 11 in such a way that firstly the first AC operating voltage $u_{P1}$ is provided to supply electric power to the primary load M and secondly the electrical potential difference between at least two of the supply terminals $P_1$, $P_2$, $S_1$ is greater than a voltage required for operating the secondary load 3.

If a DC voltage is required for operation of the secondary load 3, there may preferably be provision for a rectifier 13, the input side of which is connected to the first primary supply terminal $P_1$, to the second primary supply terminal $P_2$ and to the first secondary supply terminal $S_1$ in order to generate the desired DC voltage from one or more of the potential differences $u_{S11}$, $u_{S12}$, $u_{P1}$ produced between said supply terminals $P_1$, $P_2$, $S_1$ connected to the input side.

Optionally, the rectifier 13 may have an electronic valve arrangement 14 or be in the form of an electronic valve arrangement 14 (cf. description hereinafter relating to FIG. 4). In this way, the controllability and configurability and also availability of the first secondary voltage $u_{S11}$ or $u_{S12}$ may be simpler regardless of the first AC operating voltage $u_{P1}$.

Advantageously, the invention also allows the supply of power to the secondary load 3 by the first secondary voltage $u_{S11}$ or $u_{S12}$ to be ensured when the electric motor is operating at low speeds and even when the electric motor is at a standstill.

A rectifier 13 and in particular a valve arrangement 14 are not absolutely necessary for all applications to the same extent.

The control device 8 may additionally be communicatively connected to the control module 7 or to the battery management system of the battery 6 (shown in dashed lines in FIG. 1) in order to receive from the control module 7 the aforementioned state information relating to the individual battery cells 5 and to take said state information into account when configuring the inverter modules 10, 11 for generating the first AC operating voltage $u_{P1}$ and the first secondary voltage $u_{S11}$ or $u_{S12}$. The control device 8 may in particular be designed to either include or at least intermittently exclude one of the DC voltage sources 5 or battery cells in the generation of the first AC operating voltage $u_{P1}$ and the first secondary voltage $u_{S11}$ or $u_{S12}$ on the basis of the state information transferred from the control module 7 to that DC voltage source 5. This not least allows charge balancing to be carried out between the battery cells 5.

The charge balancing options can be improved further if the control device 8 is designed to interrupt a circuit for the primary load M, in particular when the primary load M is intermittently not intended to be operated, for example when the electric motor is at a standstill. To this end, the control device 8 can turn off at least one power-electronics switching element situated in the circuit.

There may be provision for a computer program, comprising control commands that, when the program is executed by the control device 8, cause said control device to carry out a corresponding method for supplying electric power to the primary load M and the secondary load 3.

Figure 2:
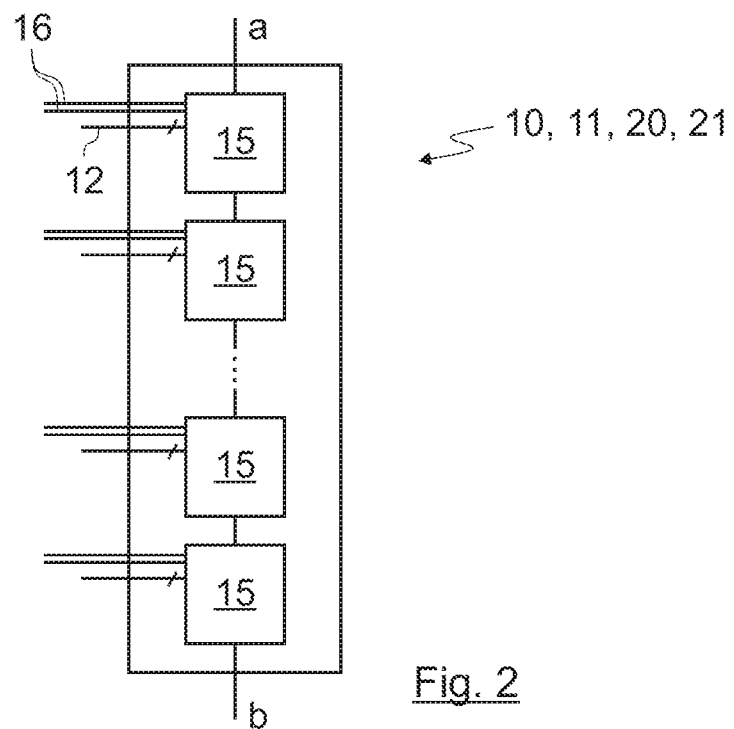
FIG. 2 shows an illustrative inverter module of a circuit arrangement according to the invention with multiple individually configurable inverter units.

The configurable inverter modules 10, 11 may be in any form, in principle. Preferably, however, the first inverter 9 is in the form of a modular inverter and has inverter modules 10, 11, as are shown by way of illustration in FIG. 2. The inverter modules 10, 11 may be in the form of a cascade of multiple inverter units 15, each of the inverter units 15 being able to be connected to a different instance of the DC voltage sources 5. The applicable supply lines 16 that can be connected to the battery cells or DC voltage sources 5 are indicated in FIG. 2. Furthermore, the communication lines 12 connected to the control device 8 of the circuit arrangement 4 are shown. In this way, an AC voltage produced in steps from the individual DC voltage sources 5 may be able to be generated by appropriately configuring the inverter modules 10, 11.

Figure 3:
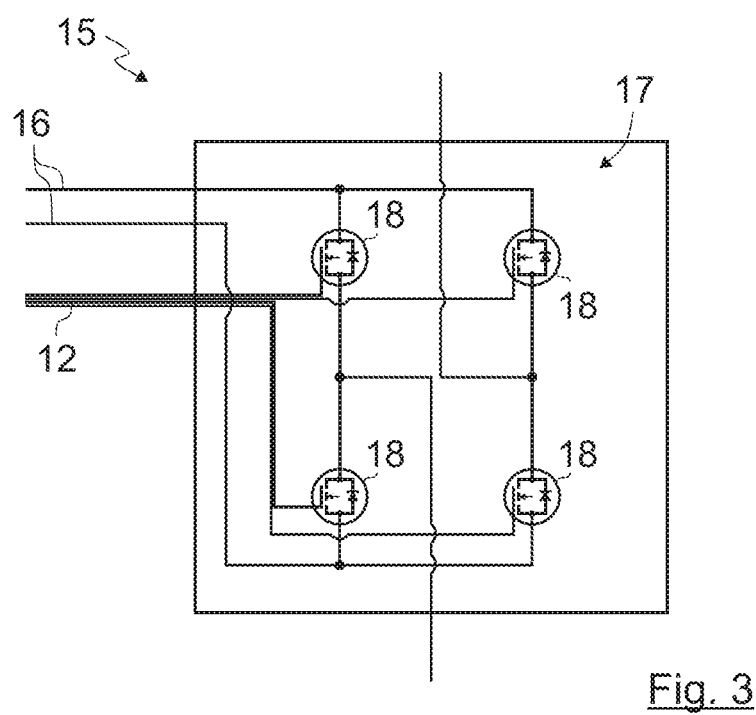
FIG. 3 shows an H-bridge circuit of an illustrative inverter unit of an inverter module of a circuit arrangement according to the invention.

A possible design of an individual inverter unit 15 is shown in FIG. 3 by way of illustration. The inverter units 15 may in particular each have an H-bridge circuit 17 comprising four power-electronics switching elements 18 that are configurable by the control device 8. By way of example, the power-electronics switching elements 18 may be in the form of semiconductor devices, in particular in the form of MOSFETs indicated in FIG. 3.

At this juncture, it will be mentioned that the number of H-bridge circuits 17 in the individual inverter modules 10, 11 does not necessarily have to be identical.

Figure 4:
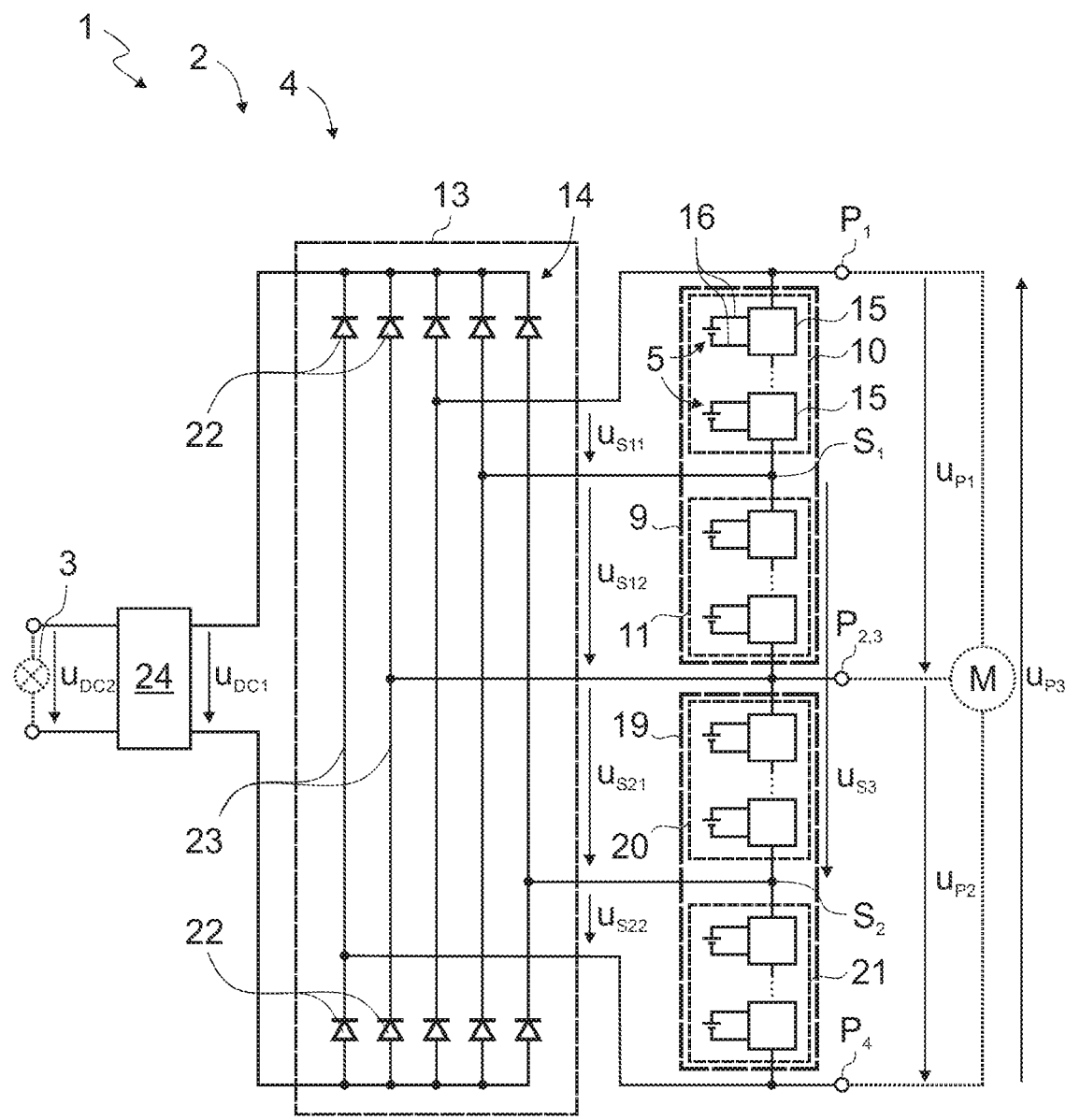
FIG. 4 shows an electrical load arrangement according to the invention with a power supply system according to the invention that has a circuit arrangement according to a second exemplary embodiment of the invention.

A more complex instance of application of the invention is shown on the basis of a second exemplary embodiment in FIG. 4. The control device 8 and some further details described above are not shown in FIG. 4 for simplification.

The primary load M in the exemplary embodiment in FIG. 4 is a three-phase electric motor, or an electric motor that can be operated with three-phase current. The secondary load 3 is in turn a secondary load 3 that can be operated with a DC voltage.

The circuit arrangement 4 again has a first inverter 9 in order to provide the first AC operating voltage $u_{P1}$ for supplying electric power to the primary load M between the first primary supply terminal $P_1$ and the second primary supply terminal $P_2$. The first inverter 9 may be designed as already described for the exemplary embodiment in FIG. 1 or in FIGS. 2 and 3.

To generate the three-phase voltage, there is also provision in the exemplary embodiment shown in FIG. 4 for a second inverter 19, which has a third primary supply terminal $P_3$ and a fourth primary supply terminal $P_4$, between which a second AC operating voltage $u_{P2}$ for supplying electric power to the primary load M is present. The third primary supply terminal $P_3$ of the second inverter 19 is connected to the second primary supply terminal $P_2$ of the first inverter 9.

In the exemplary embodiment shown, the first inverter 9 and the second inverter 19 are of identical design. The second inverter 19 thus has a configurable third inverter module 20 and a configurable fourth inverter module 21, the output side of which is connected in series with the third inverter module 20, which collectively provide the second AC operating voltage $u_{P2}$ and the input side of each of which can be connected to at least one DC voltage source 5 and is likewise configurable by the control device 8 in order to adjust the amplitude, phase and/or frequency of the second AC operating voltage $u_{P2}$.

The second AC operating voltage $u_{P2}$ finally corresponds to the sum of the individual output voltages $u_{S21}$, $u_{S22}$ of the third inverter module 20 and the fourth inverter module 21.

For three-phase operation, the primary load M is connected to the first primary supply terminal $P_1$, the second primary supply terminal $P_2$ or the third primary supply terminal $P_3$ and the fourth primary supply terminal $P_4$. A third AC operating voltage $u_{P3}$ is present between the first primary supply terminal $P_1$ and the fourth primary supply terminal $P_4$, which third AC operating voltage corresponds to the negative total voltage from the first AC operating voltage $u_{P1}$ and the second AC operating voltage $u_{P2}$. The voltage equation that applies is therefore:

$$u_{P1} + u_{P2} + u_{P3} = 0.$$

To generate a symmetrical three-phase voltage, the AC operating voltages $u_{P1}$, $u_{P2}$, $u_{P3}$ and the currents thereof are generated with the same amplitude $\hat{U}$ and a phase shift relative to one another of 120° in each case, according to:

$$u_{P1} = \hat{U} \cdot \cos(2\pi ft)$$
$$u_{P2} = \hat{U} \cdot \cos(2\pi ft - 120°)$$
$$u_{P3} = \hat{U} \cdot \cos(2\pi ft - 240°).$$

The second inverter 19 additionally has a second secondary supply terminal $S_2$, which is arranged between the third inverter module 20 and the fourth inverter module 21. The control device 8 is designed to configure the inverter modules 20, 21 of the second inverter 19 in such a way that a second secondary voltage $u_{S21}$ or $u_{S22}$ is produced between the second secondary supply terminal $S_2$ and one of the primary supply terminals $P_3$, $P_4$ of the second inverter 19 to supply power to the secondary load 3.

The two inverters 9, 19 may therefore be divided into four partial inverters or inverter modules 10, 11, 20, 21. This advantageously results in the two additional supply terminals, referred to as secondary supply terminals $S_1$, $S_2$ in the present case. Applicable potential differences $u_{P1}$, $u_{P2}$, $u_{P3}$, $u_{S11}$, $u_{S12}$, $u_{S3}$, $u_{S21}$, $u_{S22}$ (cf. FIG. 4), which may advantageously be suitable for supplying power to the secondary load 3 individually or in combination, are produced between all the supply terminals (that is to say the primary supply terminals $P_1$, $P_2$, $P_3$, $P_4$ and the secondary supply terminals $S_1$, $S_2$). The total of five supply terminals $P_1$, $P_2$ or $P_3$, $P_4$, $S_1$ and $S_2$ are connected to a rectifier 13 in the form of an electronic valve arrangement 14 in the exemplary embodiment in FIG. 4.

The electronic valve arrangement 14 in the present case comprises ten power-electronics valves, which are in the form of individual diodes 22 to reduce cost. The valve arrangement 14 has one diode section 23, comprising two diodes 22 oriented in the same direction of current flow and connected to form a series arrangement, per supply terminal $P_1$, $P_2$ or $P_3$, $P_4$, $S_1$ and $S_2$ attached to the input side, the supply terminal $P_1$, $P_2$ or $P_3$, $P_4$, $S_1$ and $S_2$ associated with the respective diode section 23 being attached between the two diodes 22 of the diode section 23, and the output sides of all the diode sections 23 being connected in parallel in order to collectively generate the DC voltage $u_{DC1}$ to supply electric power to the secondary load 3. The valve arrangement 14 allows the greatest of the potential differences $u_{S11}$, $u_{S12}$, $u_{S3}$, $u_{S21}$, $u_{S22}$ to always be able to be used to supply power to the secondary load 3. Finally, in particular the additional secondary supply terminals $S_1$, $S_2$ can be used to ensure that at least one of the potential differences $u_{P1}$, $u_{P2}$, $u_{P3}$, $u_{S11}$, $u_{S12}$, $u_{S3}$, $u_{S21}$, $u_{S22}$ between the supply terminals $P_1$, $P_2$ or $P_3$, $P_4$, $S_1$ and $S_2$ is greater than the rated voltage required for the secondary load 3.

When the motor speed is high, the amplitude U of the AC operating voltages $u_{P1}$, $u_{P2}$, $u_{P3}$ is generally greater than the rated voltage required for the secondary load 3 anyway. For this reason alone, the rectifier 13 can therefore generate a sufficiently high output voltage for supplying power to the secondary load 3. At lower speeds, on the other hand, if the amplitude U is not great enough, at least one of the potential differences $u_{S11}$, $u_{S12}$, $u_{S3}$, $u_{S21}$, $u_{S22}$ can finally be adjusted to nevertheless ensure that the secondary load 3 can still be supplied with an adequate voltage.

Optionally, there may also be provision for a DC chopper 24, the input side of which is connected to the output-side DC voltage $u_{DC1}$ of the rectifier 13 and the output side of which provides a regulated AC operating voltage $u_{DC2}$ for operation of the secondary load 3. A DC chopper 24 is not necessary for all applications to the same extent, however.

What is claimed is:

1. A circuit arrangement for supplying electric power to a primary load, which can be connected to the circuit arrangement, by means of a first AC operating voltage, comprising a control device and at least one first inverter, which has a first primary supply terminal and a second primary supply terminal, between which the first AC operating voltage is present, wherein the first inverter has a configurable first inverter module and a configurable second inverter module, the output side of which is connected in series with the first inverter module, which collectively provide the first AC operating voltage and the input side of each of which can be connected to at least one DC voltage source and to the control device, and which are designed to adjust amplitudes, phases and/or frequencies on the output side, for providing the first AC operating voltage, as specified by the control device, and the first inverter having a first secondary supply terminal that is arranged between the first inverter module and the second inverter module, the control device being designed to configure the inverter modules of the first inverter in such a way that a first secondary voltage is produced between the first secondary supply terminal and one of the primary supply terminals of the first inverter to supply power to a secondary load that can be connected to the circuit arrangement, wherein the control device is designed to always configure the inverter modules in such a way that firstly the at least one AC operating voltage is provided to supply electric power to the primary load, and secondly the electrical potential difference between at least two of the supply terminals is greater than a voltage required for operating the secondary load.

2. The circuit arrangement as claimed in claim 1, wherein a second inverter, which has a third primary supply terminal and a fourth primary supply terminal, between which a second AC operating voltage to supply electric power to the primary load is present, the third primary supply terminal of the second inverter being connected to the second primary supply terminal of the first inverter.

3. The circuit arrangement as claimed in claim 2,
wherein the second inverter has a configurable third inverter module and a configurable fourth inverter module, the output side of which is connected in series with the third inverter module, which collectively provide the second AC operating voltage and the input side of each of which can be connected to at least one DC voltage source and to the control device, and which are designed to adjust amplitudes, phases and/or frequencies on the output side, for providing the second AC operating voltage, as specified by the control device.

4. The circuit arrangement as claimed in claim 3,
wherein the second inverter has a second secondary supply terminal that is arranged between the third inverter module and the fourth inverter module, the control device being designed to configure the inverter modules of the second inverter in such a way that a second secondary voltage is produced between the second secondary supply terminal and one of the primary supply terminals of the second inverter to supply power to the secondary load.

5. The circuit arrangement as claimed in claim 2, wherein the primary load can be connected to the first primary supply terminal, the second primary supply terminal and the fourth primary supply terminal for three-phase operation, wherein a third AC operating voltage is present between the first primary supply terminal and the fourth primary supply terminal, which third AC operating voltage corresponds to the negative total voltage from the first AC operating voltage and the second AC operating voltage, and wherein the three AC operating voltages have the same amplitudes and a respective phase difference of 120° in relation to one another.

6. The circuit arrangement as claimed in claim 1, wherein:
   a) the first AC operating voltage corresponds to the sum of the individual output voltages of the first inverter module and the second inverter module; and/or
   b) the second AC operating voltage corresponds to the sum of the individual output voltages of the third inverter module and the fourth inverter module.

7. The circuit arrangement as claimed in claim 1, wherein the inverter modules are each in the form of a cascade of multiple inverter units, each of the inverter units being able to be connected to a different instance of the DC voltage sources.

8. The circuit arrangement as claimed in claim 7, wherein the inverter units each have an H-bridge circuit comprising four power-electronics switching elements that are configurable by the control device.

9. The circuit arrangement as claimed in claim 7, wherein the control device is designed to interrupt a circuit for the primary load by virtue of the control device turning off at least one power-electronics switching element, situated in the circuit, of at least one of the inverters, in particular at least one of the power-electronics switching elements of one of the inverter units of one of the inverter modules.

10. The circuit arrangement as claimed in claim 1, further comprising a rectifier for providing a DC voltage to supply electric power to the secondary load, the input side of the rectifier being connected to the first primary supply terminal, the second primary supply terminal, the fourth primary supply terminal, the first secondary supply terminal and/or the second secondary supply terminal in order to generate the DC voltage from one or more of the potential differences produced between said supply terminals connected to the input side.

11. The circuit arrangement as claimed in claim 10, wherein the rectifier has an electronic valve arrangement that is connected to the supply terminals attached to the input side.

12. The circuit arrangement as claimed in claim 11, wherein the electronic valve arrangement has one diode section, comprising two diodes oriented in the same direction and connected to form a series arrangement, per supply terminal attached to the input side, the supply terminal associated with the respective diode section being attached between the two diodes of the diode section, and the output sides of all the diode sections being connected in parallel in order to collectively generate the DC voltage to supply electric power to the secondary load.

13. The circuit arrangement as claimed in claim 10, further comprising a DC chopper, the input side of which is connected to the output-side DC voltage of the rectifier, and the output side of which provides a rated operating voltage for operation of the secondary load.

14. The circuit arrangement as claimed in claim 1, wherein the control device is communicatively connected to a control module of at least one of the DC voltage sources in order to receive from the control module state information relating to the at least one DC voltage source, the control device further being designed to take the state information into account when configuring the inverter modules for generating the at least one AC operating voltage and the secondary voltage.

15. The circuit arrangement as claimed in claim 14, wherein the control device is designed to either include or at least intermittently exclude one of the DC voltage sources in the generation of the at least one AC operating voltage and the at least one secondary voltage on the basis of the state information transferred from the control module to that DC voltage source.

16. An electrical load arrangement, in particular an electric vehicle, comprising a power supply system including a circuit arrangement as claimed in claim 1, the primary load and the secondary load.

17. The electrical load arrangement as claimed in claim 16, wherein the primary load has an electric motor, in particular an AC motor or a three-phase motor.

18. A method for supplying electric power to a primary load by way of a first AC operating voltage and to a secondary load by way of at least one first secondary voltage, comprising at least the following method steps:
   operating at least one first inverter, which has a first inverter module and a second inverter module, the output side of which is connected in series with the first inverter module, the input side of each of the two inverter modules being connected to at least one DC voltage source; and
   adjusting output-side amplitudes, phases and/or frequencies of the inverter modules in order to generate the first AC operating voltage between external primary supply terminals of the series arrangement formed by the inverter modules, and in order to generate the first secondary voltage between a first secondary supply terminal, which is arranged between the two inverter modules, and at least one of the external primary supply terminals;
wherein the first and second inverter modules are operated in such a way that firstly the first AC operating voltage is provided to supply electric power to the primary load, and secondly an electrical potential difference between the supply terminals is greater than a voltage required for operating the secondary load.

* * * * *